United States Patent
Kahle et al.

(12) 
(10) Patent No.: US 6,728,866 B1
(45) Date of Patent: Apr. 27, 2004

(54) PARTITIONED ISSUE QUEUE AND ALLOCATION STRATEGY

(75) Inventors: James Allan Kahle, Austin, TX (US); Charles Roberts Moore, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 648 days.

(21) Appl. No.: 09/652,049

(22) Filed: Aug. 31, 2000

(51) Int. Cl.[7] .............................. G06F 9/30; G06F 9/40; G06F 9/52; G06F 13/16
(52) U.S. Cl. .................. 712/215; 712/206; 712/217; 712/219; 712/226; 712/245; 712/41; 711/173
(58) Field of Search ...................... 712/221, 222, 712/215, 219, 206, 43, 23, 41, 245, 226, 217; 708/628; 709/208; 711/173

(56) References Cited

U.S. PATENT DOCUMENTS

| | | | |
|---|---|---|---|
| 5,175,829 A | * 12/1992 | Stumpf et al. | 712/203 |
| 5,509,130 A | * 4/1996 | Trauben et al. | 712/215 |
| 5,892,699 A | * 4/1999 | Duncan et al. | 708/628 |
| 5,978,838 A | * 11/1999 | Mohamed et al. | 709/208 |

* cited by examiner

*Primary Examiner*—Daniel H. Pan
(74) *Attorney, Agent, or Firm*—Joseph P. Lally; Volel Emile; Thomas E. Tyson

(57) ABSTRACT

A microprocessor and method of processing instructions for addressing timing assymetries are disclosed. A sequence of instructions including a first instruction and a second instruction are received. Dependency logic determines if any dependencies between the first and second instructions. The dependency logic then selects between first and second issue queue partitions for storing the first and second instructions pending issue based upon the dependency determination, wherein the first issue queue partition issues instructions to a first execution unit and the second issue queue partition issues instructions to a second execution unit. The first and second issue queue partitions may be asymmetric with respect to a first register file in which instruction results are stored. The first and second instructions are then stored in the selected partitions. Selecting between the first and second issue queue partitions may include selecting a common issue queue partition for the first and second instructions if there is a dependency between the first and second instructions and selecting between the first and second issue queue partition may be based upon a fairness algorithm if the first and second instructions lack dependencies.

17 Claims, 4 Drawing Sheets

PARTITIONED ISSUE QUEUE AND ALLOCATION STRATEGY

BACKGROUND

1. Field of the Present Invention

The present invention generally relates to the field of microprocessors and more particularly to a microprocessor incorporating a partitioned issue queue and a method of allocating instructions thereto.

2. History of Related Art

In the field of microprocessor architecture, an issue queue generally provides a facility for storing instructions pending execution in one or more execution units associated with the issue queue. An execution unit typically includes facilities for updating a register file in which the instruction's operands are stored pending execution and in which the operation's results are stored following execution. If multiple instances of an execution unit are incorporated into the microprocessor architecture, each execution unit may include its own register file. When an instruction is executed in a particular execution unit, the result is generally posted to the register files associated with each execution unit in the event that an instruction in one of the other execution units requires the result to perform a given operation.

Thus, after completion of an instruction, a register file local to the execution unit that performed the operation is updated and one or more other register files associated with other execution units are updated as well. Typically, the register file local to the execution unit that executed an instruction is physically closer than the register files of other execution units. The difference in distance between a local register file and a remote register file results in a timing asymmetry within the processor. In other words, the result of an executed instruction is updated in the local register file before it is updated in a remote register file because of the greater interconnect delay path between the execution unit and the remote file.

Traditionally, asymmetries in the layout of a microprocessor were of little concern because the processor cycles times were sufficient to allow for a worst case delay path. With processor cycle times decreasing below 1 nanosecond, however, the delay path asymmetry could result in a situation where the time (number of processor cycles) required to execute a given sequence of instructions is could be affected by asymmetrical layout considerations. If a pair of instructions include an instruction dependency, the dependent instruction must wait until the result of the first instruction is posted to the register file of the execution unit to which the dependent instruction has been issued. If the dependent instruction is issued to a different execution unit than the first instruction, the interconnect delay associated with the remote register file could negatively impact performance. It would therefore be highly desirable to implement a microprocessor that included an issue queue capable of selectively issuing instructions to its associated execution units to minimize overall execution time. In addition, it would be further desirable if the implemented solution did not significantly increase the cost or complexity of the microprocessor's design and were transparent to a user (programmer) of the microprocessor.

SUMMARY OF THE INVENTION

A microprocessor and method of processing instructions that addresses the timing assymetries between functional units. A sequence of instructions including a first instruction and a second instruction are received. Dependency logic determines if any dependencies between the first and second instructions. The dependency logic then selects between first and second issue queue partitions for storing the first and second instructions pending issue based upon the dependency determination, wherein the first issue queue partition issues instructions to a first execution unit and the second issue queue partition issues instructions to a second execution unit. The first and second issue queue partitions may be asymmetric with respect to a first register file in which instruction results are stored. The first and second instructions are then stored in the selected partitions. Selecting between the first and second issue queue partitions may include selecting a common issue queue partition for the first and second instructions if there is a dependency between the first and second instructions and selecting between the first and second issue queue partition may be based upon a fairness algorithm if the first and second instructions lack dependencies.

BRIEF DESCRIPTION OF THE DRAWINGS

Other objects and advantages of the invention will become apparent upon reading the following detailed description and upon reference to the accompanying drawings in which.

Figure 1:
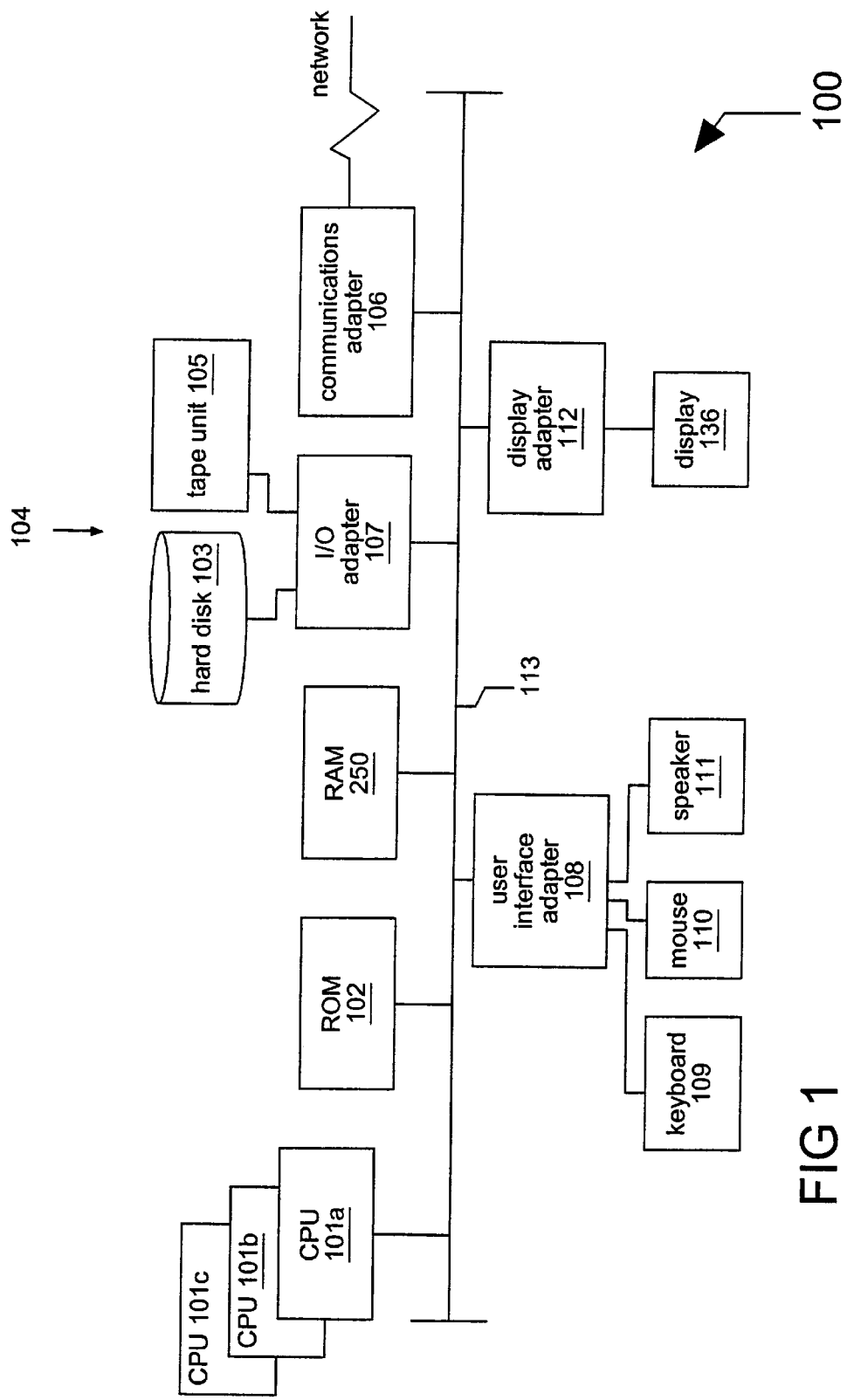
FIG. 1 is a block diagram of a data processing system.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Referring now to FIG. 1, an embodiment of a data processing system 100 according to the present invention is depicted. System 100 has one or more central processing units (processors) 101a, 101b, 101c, etc. (collectively or generically referred to as processor(s) 101. In one embodiment, each processor 101 may comprise a reduced instruction set computer (RISC) microprocessor. Additional information concerning RISC processors in general is available in C. May et al. Ed., *PowerPC Architecture: A Specification for a New Family of RISC Processors,* (Morgan Kaufmann, 1994 2d edition). Processors 101 are coupled to system memory 250 and various other components via system bus 113.

Read only memory (ROM) 102 is coupled to the system bus 113 and may include a basic input/output system (BIOS), which controls certain basic functions of system 100. FIG. 1 further depicts an I/O adapter 107 and a network adapter 106 coupled to the system bus 113. I/O adapter 107 may be a small computer system interface (SCSI) adapter that communicates with a hard disk 103 and/or tape storage drive 105. I/O adapter 107, hard disk 103, and tape storage device 105 are collectively referred to herein as mass storage 104.

A network adapter 106 interconnects bus 113 with an outside network enabling data processing system 100 to communicate with other such systems. Display monitor 136 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown).

Suitable I/O busses for connecting peripheral devices such as hard disk controllers, network adapters, and graphics adapters include the Peripheral Components Interface (PCI) bus according to PCI Local Bus Specification Rev. 2.2 available from the PCI Special Interest Group, Hillsboro Oreg., and incorporated by reference herein. Additional input/output devices are shown as connected to system bus 113 via user interface adapter 108 and display adapter 112. A keyboard 109, mouse 110, and speaker 111 all interconnected to bus 113 via user interface adapter 108, which may include, for example, a SuperI/O chip integrating multiple device adapters into a single integrated circuit. For additional information concerning one such chip, the reader is referred to the PC87338/PC97338 ACPI 1.0 and PC98/99 Compliant SuperI/O data sheet from National Semiconductor Corporation (November 1998) at www.national.com.

Thus, as configured in FIG. 1, system 100 includes processing means in the form of processors 101, storage means including system memory 250 and mass storage 104, input means such as keyboard 109 and mouse 110, and output means including speaker 111 and display 136. In one embodiment a portion of system memory 250 and mass storage 104 collectively store an operating system, such as the AIX® operating system from IBM Corporation, to coordinate the functions of the various components shown in FIG. 1. Additional detail concerning the AIX operating system is available in *AIX Version 4.3 Technical Reference: Base Operating System and Extensions, Volumes 1 and 2* (order numbers SC23-4159 and SC23-4160); *AIX Version 4.3 System User's Guide: Communications and Networks* (order number SC23-4122); and *ALX Version 4.3 System User's Guide: Operating System and Devices* (order number SC23-4121) from IBM Corporation at www.ibm.com and incorporated by reference herein.

Figure 2:
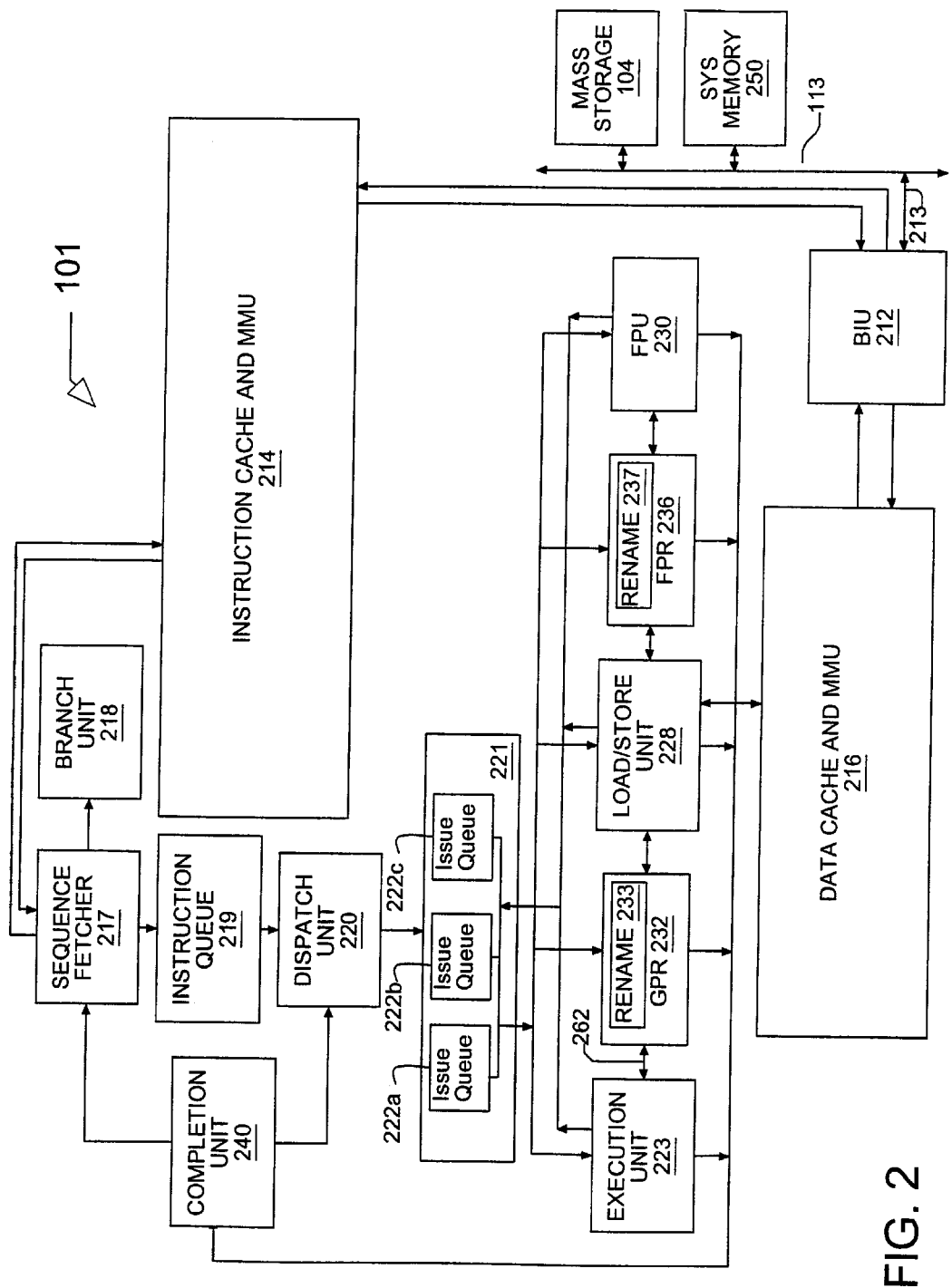
FIG. 2 is a block diagram of a processor for suitable for use in the data processing system of FIG. 1.

Turning now to FIG. 2, a simplified block diagram of an embodiment of processor 101 suitable for use in system 100 is presented. In the depicted embodiment, processor 101 comprises an integrated circuit superscalar microprocessor fabricated on a monolithic semiconductor substrate. Processor 101 includes various execution units, registers, buffers, memories, and other functional units as discussed in greater detail below. As illustrated in FIG. 2, processor 101 is coupled to system bus 113 via bus interface unit (BIU) 212 and processor bus 213, which like system bus 113 includes address, data, and control buses. BIU 212 controls the transfer of information between processor 101 and other devices coupled to system bus 113, such as system memory 250 and mass storage 104. It will be appreciated that processor 101 may include other devices coupled to system bus 113 that are not necessary for an understanding of the following description and are accordingly omitted for the sake of simplicity.

BTU 212 is connected to instruction cache and memory management unit 214 and data cache and memory management unit 216 within processor 101. High-speed caches, such as those within instruction cache 214 and data cache 216, enable processor 101 to achieve relatively fast access times to a subset of data or instructions previously transferred from system memory 250, thus improving the speed of operation of data processing system 100. Data and instructions stored within data cache 216 and instruction cache 214, respectively, are identified and accessed by address tags, which each comprise a selected number of bits (typically the high-order bits) of the system memory physical address in which the data or instructions reside. Sequential fetch unit 217 retrieves instructions for execution from instruction cache 214 during each clock cycle. In one embodiment, if sequential fetch unit 217 retrieves a branch instruction from instruction cache 214 the branch instruction is forwarded to branch processing unit (BPU) 218 for execution.

Sequential fetch unit 217 forwards non-branch instructions to an instruction queue 219, where the instructions are stored temporarily pending execution by other functional units of processor 101. A dispatch unit 220 is responsible for retrieving stored instructions from queue 219 and forwarding the instructions to an issue unit (ISU) 221. Dispatch unit 220 schedules dispatch of instructions to issue unit 221 based, in part, on instruction completion information received from a completion unit 240. The depicted embodiment of ISU 221 includes one or more issue queues 222a, 222b, 222c, etc. (collectively or generically referred to issues queue(s) 222). ISU 221 is responsible for maintaining fully loaded pipelines by issuing new instructions in each cycle to the execution units whenever possible. In one embodiment, instructions are issued from ISU 221 out-of-order.

In the depicted embodiment, the execution circuitry of processor 101, in addition to BPU 218, includes multiple execution units, including a general purpose fixed-point-unit execution unit (FXU) 223, a load/store unit (LSU) 228 and floating point execution unit(s) (FPU) 230. FXU 223 may represent a dedicated fixed-point arithmetic and logical unit capable of performing fixed point addition, subtraction, ANDing, ORing, and XORing, utilizing source operands received from specified general purpose registers (GPRs) 232. In other embodiments, execution unit 223 may include a load/store unit as well as an arithmetic/logic unit. Following the execution of a fixed-point instruction, the fixed point execution unit 223 outputs the results of the instruction to GPR buffers 232, which provide storage for the result received on result bus 262.

The FPU 230 is capable of performing single and double-precision floating-point arithmetic and logical operations, such as floating-point multiplication and division, on source operands received from floating-point registers (FPRS) 236. FPU 230 outputs data resulting from the execution of floating-point instructions to selected FPR buffers 236 for storage. LSU 228 typically executes floating-point and fixed-point load instructions that load data from data cache 216, a lower level cache memory (not depicted), or system memory 250 into selected GPRs 232 or FPRs 236 or and floating-point and fixed-point store instructions, which store data from a selected one of GPRs 232 or FPRs 236 to data cache 216 and, ultimately, to system memory 250.

In the preferred embodiment, processor 101 employs out-of-order instruction execution to further improve the performance of its superscalar architecture. Accordingly, instructions can be executed by FXU 223, LSU 228, and FPU 230 in an order that varies from the original program order of the instructions as long as data dependencies are observed. As indicated previously, instructions are processed by each of FXU 223, LSU 228, and FPU 230 as a sequence of pipeline stages. In one embodiment, processor 101 includes five distinct pipeline stages, namely, fetch, decode/dispatch, execute, finish, and completion.

During the fetch stage, sequential fetch unit 217 retrieves one or more non-branch instructions from instruction cache 214 and stores the fetched instructions within instruction queue 219. In contrast, sequential fetch unit 217 forwards any branch instructions from the instruction stream to BPU 218 for execution. BPU 218 includes a branch prediction mechanism that includes, in one embodiment, a dynamic prediction mechanism such as a branch history table that enables BPU 218 to speculatively execute unresolved conditional branch instructions by predicting whether or not the branch will be taken.

During the decode/dispatch stage, dispatch unit 220 and ISU 221 decode and issue one or more instructions from issue queues 222 to execution units 223, 228, and 230, typically in program order. ISU 221 may allocate one or more rename buffers within GPR rename buffers 233 or FPR rename buffers 237 for temporarily storing the result (or results) of an instruction prior to committing the result or results to GPRs 232 and FPRs 237. In addition, instructions (or instructions identifiers or tags representative of the instructions) may be stored within the multiple-slot completion buffer (the completion table) of completion unit 240 as a means of tracking which instructions have completed.

During the execute stage, execution units 223, 228, and 230 execute instructions issued from ISU 220 opportunistically as operands and execution resources for the indicated operations become available. Execution units 223, 228, and 230 may include reservation stations that stores instructions dispatched to that execution unit until operands or execution resources become available. After execution of an instruction has terminated, execution units 223, 228, and 230 store data results, if any, within either GPRs or FPRs, depending upon the instruction type. In the depicted embodiment, execution units 223, 228, and 230 notify completion unit 240 which instructions have finished execution. Finally, instructions are completed in program order out of the completion table of completion unit 240. Instructions executed by FXU 223 and FPU 230 are completed by transferring data results of the instructions from GPR rename buffers 233 and FPR rename buffers 237 to GPRs 232 and FPRs 236, respectively.

Processor 101 preferably supports out-of-order speculative instruction execution. Instructions may be speculatively executed based upon on a predicted branch or beyond an instruction that may cause an interrupt condition. In the event of a branch misprediction or an interrupt, hardware automatically flushes undesired instructions from the pipelines and discards undesired results. Incorrect speculative results are selectively flushed from all units in one clock cycle, and instruction issue can resume the following clock cycle.

When an instruction is issued, ISU 221 may tag the instruction in such a manner that relative age between any two instructions can be easily determined. In one embodiment, sequential instructions are tagged with integer values (ITAGs). In another embodiment, multiple instructions may be grouped together for tracking purposes and assigned a common identifier referred to herein as a group tag (GTAG). In addition to providing a mechanism for determining the order and relative age of issued instructions, ITAGs and GTAGs provide a shorthand representation of their corresponding instructions. The tag value of an instruction is associated with queue entries and pipeline stages in which it resides. The use of tags facilitates an instruction flush mechanism (in response to a processor-generated flush instruction) in which a magnitude comparison between the ITAG or GTAG associated with the flush instruction and the ITAG or GTAG associated with a particular queue entry or execution unit stage is performed and the entry invalidated if it is for an instruction which is as young or younger than (i.e., issued simultaneously or after) the flushed instruction. All remnants of the flushed instruction (and all subsequent instructions) are "flushed" from the machine and the fetch unit is redirected to the fetch starting at the address of the "flushed" instruction.

Figure 3:
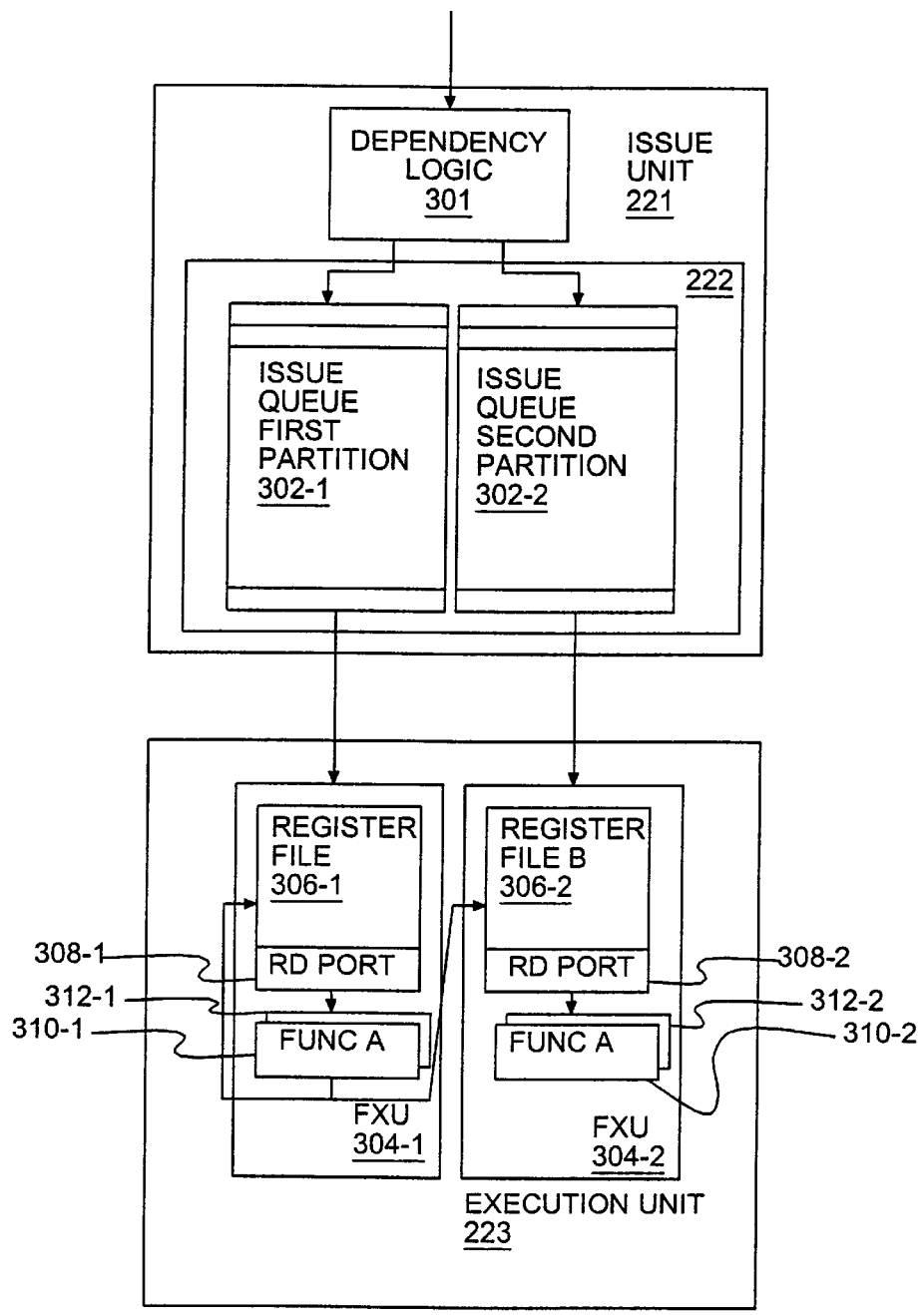
FIG. 3 is a block diagram of a partitioned issue queue according to one embodiment of the present invention.

Turning now to FIG. 3, a diagram illustrating a portion of an execution pipeline of processor 101 including issue unit 221, issue queue 222, and execution unit 223 according to one embodiment of the invention is present. In this embodiment, execution unit 223 includes a first side 304-1 and a second side 304-2 (generically or collectively referred to as side(s) 304). In the depicted embodiment, each side 304 is itself a functional unit that includes a register file 306 and a first functional unit 310. Thus, first side 304-1 includes a register file 306-1 and a functional unit 310-1 while second side 304-2 includes a register file 306-2 and a functional unit 310-2. Each first functional unit 310 may comprise, as examples, a fixed point adder/comparator or a fixed point load/store unit. In another embodiment, each side 304 of execution unit 223 includes a first functional unit 310 and a second functional unit 312 that share a common register file. In this embodiment, first functional unit 310 may comprise a fixed point adder/comparator and second functional unit 312 may comprise a load/store unit.

When issue unit 221 issues an instruction from issue queue 222 to execution unit 223, the instruction is assigned to one side 304 of execution unit 223 and the instruction operands are stored in the corresponding register file 306. The corresponding functional unit 310 (or 312) then retrieves the operands via read port 308 from register file 306 when the instruction is executed, performs the required operation, and returns the result to register file 306 where it may be required as an operand for a subsequent instruction. In one embodiment, the results produced by functional unit 310 are also stored in the register file 306 on the other side of 304 of execution unit 223 because a subsequent instruction that needs the data produced by the first instruction may be allocated to the second side 304 of execution unit 223. Thus, if an instruction is assigned to first side 304 of execution unit 223, the result produced by functional unit 310-1 is returned to register file 306-1 on first side 304-1 and to register file 306-2 on second side 304-2.

Historically, the difference in time required for a result to traverse the interconnect leading from the functional unit 310 to the register files 306 was insignificant in comparison to the processor cycle time. Under such circumstances, timing asymmetries caused by differences between the distance from the first functional unit 310-1 to first and second register files 306-1 and 306-2 were generally not critical and could be largely ignored. As processor speeds have increased beyond the gigahertz threshold, however, the interconnect delay has become a significant consideration in the architectural design. Under the assumption that first functional unit 310-1 is physically closer to first register file 306-1 than it is to second register file 306-2, the result arrives at first register file 306-1 before it arrives at second register file 306-2.

In a worst case scenario, the timing difference associated with asymmetries in the physical layout may result in one or more unnecessary additional processor cycles to complete a sequence of instructions when there are dependencies between the instructions. The depicted embodiment of the invention addresses this concern by implementing issue queue 222 with a first partition 302-1 that is dedicated to first side 304-1 of execution unit 223 and a second partition 302-2 that is dedicated to second side 304-2. In addition, the depicted embodiment of issue unit 221 includes dependency logic 301 that determines allocation of instructions to issue queue partitions 302-1 and 302-2 based upon dependencies between the operations.

Dependency logic 301 is preferably enabled to receive a sequence of instructions and to evaluate the source and destination operands of the instructions to determine dependencies between instructions. If an Instruction B requires a result that is generated by an Instruction A, Instruction B is said to have a true dependency on Instruction A. If instruction A and instruction B are executed closely in time, Instruction B may be stalled waiting for the result from instruction A. The likelihood of an instruction dependency resulting in a stall is increased if the non-dependent instruction is executed on one side 304-1 of execution unit 223 and the dependent instruction is executed on the other side 304-2 because of the longer time required to get the result of the non-dependent instruction into register file 306-2 where it is available for use by the dependent instruction.

In one embodiment, the dependency logic 302 is enabled to reduce the performance impact of instruction dependencies and layout asymmetries by allocating instructions in a dependency chain (i.e., an instruction and the instructions that are directly or indirectly dependent upon the result of the instruction) to a common side 304 of execution unit 223. To the extent that instructions in an instruction sequence lack dependencies on each other, dependency logic 301 is free to allocate instructions to issue queue partitions 302-1 and 302-2 based upon a predetermined fairness algorithm such as by allocating non-dependent instructions alternatively between the two issue queue partitions 302 or by allocating non-dependent instructions to the issue queue that has the most available entries. When instruction dependencies are detected by dependency logic 301, instructions from a common dependency chain are preferably allocated to the same partition 302 of issue queue 222. Dependency logic 301 may determine instruction dependencies by recording the source and destination operands of each instruction currently awaiting execution in issue queue 222. As new instructions arrive, their operands are compared with the operands of pending instructions to determine if the new instruction requires an operand of another pending instruction.

In the depicted embodiment, allocating instructions to a common partition 302 ensures that the instructions are executed in a common side 304 of execution unit 223 because each partition is hardwired to a corresponding side 304 of execution unit 223. Thus, instructions allocated to first partition 302-1 are issued to and execute in first side 304-1 of execution unit 223 while instructions that are allocated to second partition 302-2 of issue queue 222 are issued to and execute in second side 304-2 of execution unit 223. The depicted embodiment of the invention improves performance by determining instruction dependencies prior to issue and allocating instructions to issue queue partitions based on the determined dependencies. Instructions can then be issued directly to the corresponding side 304 of execution unit 223 without any delay associated with determining which execution unit to choose.

Figure 4:
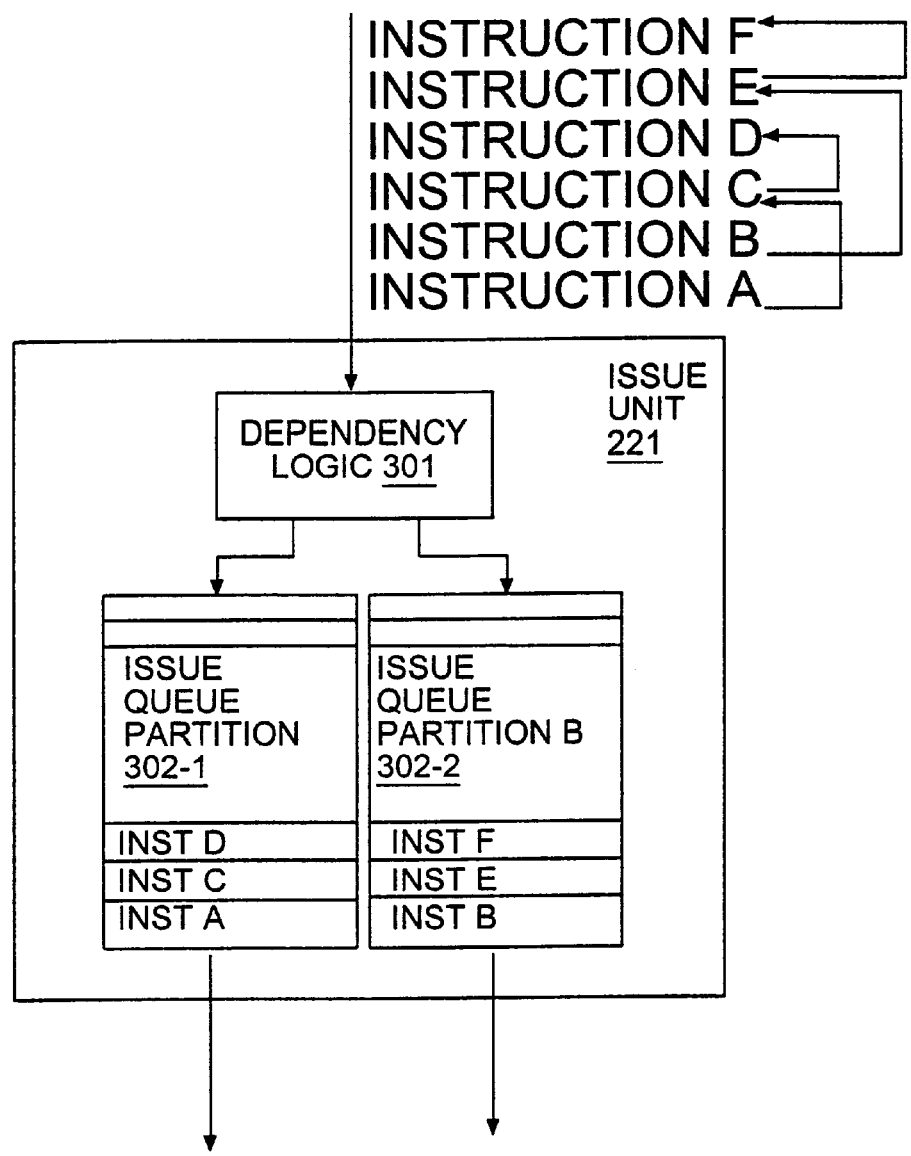
FIG. 4 is a flow diagram illustrating the operation of partitioned issue queue of FIG. 3.

Turning now to FIG. 4, the operation of issue unit 221 and dependency logic 302 according to one embodiment of the invention is illustrated. In the illustration, a sequence of instructions including instructions A through F are received by issue unit 221 and dependency logic 301. In the example illustrated, instructions A, C, and D form a first dependency chain because instruction C is dependent upon the result of instruction A, and instruction D is dependent upon the result of instruction C. Similarly, instructions B, E, and F form a second dependency chain because instruction E depends upon instruction B and instruction F depends upon instruction E. Whereas a random allocation scheme might allocate these incoming instructions to partitions 302 of issue queue 222 based on the number of available entries in the queues or according to some other fairness scheme, dependency logic 302 detects the dependencies that define the first and second dependency, overrides the default issue queue assignment mechanism, and forwards the instructions to the issue queue partitions based on their dependency chain. More specifically, because instructions A, C, and D form a dependency chain, they are each allocated to a common issue queue partition 302. Similarly, because instructions B, E, and F form a dependency chain, they are allocated to a common partition 302 of issue queue 222. Since the delay required for dependent instructions to receive the results of parent instructions A and C is a function of the length of the interconnect between the functional unit in which the parent is executed and the register file of the execution unit in which the dependent instruction is executed, the invention improves performance by biasing instructions that form a common dependency chain into the same side 304 of the execution unit 223. In this manner, each instruction within the dependency chain will receive the results from the instructions upon which they depend in the short possible time.

It will be apparent to those skilled in the art having the benefit of this disclosure that the present invention contemplates improved performance by allocating instructions to issue queue partitions based, at least in part, upon instruction dependencies to account for timing asymmetries in the execution units. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of processing instructions in a microprocessor, comprising:

receiving a sequence of instructions comprising at least a first instruction and a second instruction;

determining if the second instruction is dependent on the first instruction;

selecting between first and second issue queue partitions based upon the dependency determination, wherein the first issue queue partition issues instructions to a first execution unit and the second issue queue partition issues instructions to a second execution unit;

storing the first and second instructions in the selected partitions pending execution; and determining if a third instruction forms a dependency chain with the first and second instructions and, if so, issuing the first, second, and third instructions to a common issue queue partition.

2. The method of claim 1, wherein selecting between the first and second issue queue partitions includes selecting a common issue queue partition for the first and second instructions if there is a dependency between the first and second instructions.

3. The method of claim 1, wherein determining dependency between the first and second instructions comprises determining whether the second instruction requires the result of the first instruction.

4. The method of claim 1, wherein selecting between the first and second issue queue partition is based upon a fairness algorithm if the first and second instructions are independent.

5. The method of claim 1, wherein the first and second execution units are asymmetric with respect to a first register file in which instruction results are stored.

6. In a microprocessor, an execution pipeline comprising:

first and second execution units, both execution units being suitable for a executing a common instruction, the first execution unit including a first register file enabled to receive results from the first and second execution units and the second execution unit including a second register file enabled to receive results from the first and second execution units;

an issue queue including first and second issue queue partitions, wherein the first partition retrieves instruction operands from the first register file and issues instructions to the first execution unit and wherein the second partition retrieves instruction operands from the second register file and issues instructions to the second execution unit; and dependency logic configured to receive an instruction sequence including first and second instructions and enabled to determine dependencies between the first and second instructions and further enabled to select between the first and second partitions for storing the first and second instructions based upon the dependency determination.

7. The processor of claim 6 wherein the dependency logic is enabled to select a common issue queue partition for the first and second instructions if there is a dependency between the first and second instructions.

8. The processor of claim 6 wherein the dependency logic detects a dependency if the second instruction requires the result of the first instruction.

9. The processor of claim 6 wherein the first and second issue queue partitions are asymmetric with respect to a first register file in which results of the instructions are stored following execution.

10. The processor of claim 6 wherein the first execution unit and the second execution unit include fixed point adders.

11. The processor of claim 10 wherein the first and second execution units both further include a load/store unit.

12. A data processing system including a microprocessor, memory, input means, and display, wherein the microprocessor includes an execution pipeline comprising:

first and second execution units, both execution units being suitable for a executing a common instruction, the first execution unit including a first register file enabled to receive results from the first and second execution units and the second execution unit including a second register file enabled to receive results from the first and second execution units;

an issue queue including first and second issue queue partitions, wherein the first partition retrieves instruction operands from the first register file and issues instructions to the first execution unit and wherein the second partition retrieves instruction operands from the second register file and issues instructions to the second execution unit; and dependency logic configured to receive an instruction sequence including first and second instructions and enabled to determine dependencies between the first and second instructions and further enabled to select between the first and second partitions for storing the first and second instructions based upon the dependency determination.

13. The system of claim 12 wherein the dependency logic is enabled to select a common issue queue partition for the first and second instructions if there is a dependency between the first and second instructions.

14. The system of claim 12 wherein the dependency logic detects a dependency if the second instruction requires the result of the first instruction.

15. The system of claim 12 wherein the first and second issue queue partitions are asymmetric with respect to a first register file in which results of the instructions are stored following execution.

16. The system of claim 12 wherein the first execution unit and the second execution unit include fixed point adders.

17. The system of claim 16 wherein the first and second execution units both further include a load/store unit.

* * * * *